United States Patent [19]
Schmidt

[11] Patent Number: 5,948,997
[45] Date of Patent: Sep. 7, 1999

[54] SWAGED CONNECTION TESTING APPARATUS

[75] Inventor: Ryan Schmidt, Santa Barbara, Calif.

[73] Assignee: Intriplex Technologies, Inc., Santa Barbara, Calif.

[21] Appl. No.: 08/921,837

[22] Filed: Sep. 2, 1997

[51] Int. Cl.⁶ .................................................... G01L 3/00
[52] U.S. Cl. ...................... 73/862.08; 73/800; 29/407.02
[58] Field of Search ............................. 73/862.08, 865.8, 73/800; 29/407.01, 407.02, 407.04

[56] References Cited

U.S. PATENT DOCUMENTS

| | | | |
|---|---|---|---|
| 4,097,751 | 6/1978 | Egan et al. | 250/571 |
| 4,097,849 | 6/1978 | Taylor | 340/213 |
| 4,272,190 | 6/1981 | Shapiro | 356/124 |
| 4,427,295 | 1/1984 | Nishiyama | 356/371 |
| 4,679,029 | 7/1987 | Krohn et al. | 340/347 |
| 4,756,621 | 7/1988 | Sagara | 356/383 |
| 4,798,469 | 1/1989 | Burke | 356/376 |
| 5,097,584 | 3/1992 | Cain et al. | 29/407 |
| 5,142,770 | 9/1992 | Cain et al. | 29/407.02 |
| 5,264,909 | 11/1993 | Rochester | 356/73.1 |
| 5,299,081 | 3/1994 | Hatch et al. | 360/104 |
| 5,383,021 | 1/1995 | Hanna | 356/383 |
| 5,386,291 | 1/1995 | Sato et al. | 356/356 |
| 5,396,333 | 3/1995 | Aleshin et al. | 356/385 |
| 5,430,547 | 7/1995 | Takagi et al. | 356/375 |
| 5,446,549 | 8/1995 | Mazumder et al. | 356/376 |
| 5,481,361 | 1/1996 | Yumiki et al. | 356/375 |
| 5,486,925 | 1/1996 | Sano et al. | 356/373 |
| 5,506,400 | 4/1996 | Honma et al. | 250/205 |
| 5,554,262 | 9/1996 | Turner | 162/198 |

*Primary Examiner*—Max Noori
*Attorney, Agent, or Firm*—Fulwider Patton Lee & Utecht, LLP

[57] ABSTRACT

An apparatus for measuring the reliability of a swage mount interconnecting components of a workpiece using a computer-controlled apparatus. The apparatus includes a mechanism that connects the components by a swaging process under precisely controlled conditions and a mechanism to subsequently cause the swaged connection to fail under controlled conditions. A computer-controlled power twist mechanism applies known, controlled torques to the swaged test components. A laser beam detection system is used to monitor any displacement of the test components as the torque is applied.

11 Claims, 3 Drawing Sheets

SWAGED CONNECTION TESTING APPARATUS

BACKGROUND OF THE INVENTION

This invention relates to the swage mounting of a magnetic head-carrying suspension assembly to an actuator arm in a magnetic disk storage device for a computer. In particular, the present invention relates to a method and apparatus for forming a swaged connection between components under very controlled conditions and for testing the applied torque required to cause failure in such swaged connection.

A magnetic storage disk is "read from" or "written to" by means of a magnetic head mounted at the end of a suspension assembly that includes a spring, or load beam component that biases the head against the disc by means of its pre-load, or "gram load". The suspension assembly is in turn attached to a rigid, pivoting actuator arm which serves to precisely position the magnetic head over the many tracks of the disk corresponding to locations where digital information may be recorded. In order to meet the demand for higher-capacity drives, drive manufacturers utilize both sides of the magnetic disk, and also use multiple disks at the same time. Each side of each disk is served by its own magnetic head /suspension/actuator arm assembly. Each attachment of a suspension assembly to an actuator arm in the drive represents a potential for failure, and it is therefore important to make the mountings as reliable as possible.

"Swaging" is one method for mounting a suspension assembly to its corresponding actuator arm. In the swaging process, a precisely dimensioned and contoured boss protruding from a swage plate that is welded to the loadbeam of the suspension assembly, and surrounding a hole formed therein called the boss inside diameter is inserted into a precisely dimensioned hole formed in the actuator arm. A combination of small precision metal balls are forced through the boss inside diameter which causes the boss material to be displaced so as to expand against the walls of the actuator arm hole and thereby join the suspension/head assembly to the actuator arm in a strong friction bond. The balls may be forced through in either direction thereby exerting either a tensioning or compressive force on the boss. Many factors influence the integrity of the resulting swaged connection including, the force used to clamp the components together, the swage force required to drive the ball through the components, and the speed and acceleration with which the ball is driven through. These same variables of the swaging process can affect the change in suspension gram load caused by swaging. Such swage mount has a very low profile, allowing the separate disks to be placed closer together, reducing the overall size of the disk drive unit.

Manufacturers need to know that the swaged connection is strong enough to prevent the head/suspension assembly from "twisting out", causing head misalignment errors in following the tracks of the magnetic disk. Tolerances for twist-out torque are set by manufacturers for all head/suspension assemblies used in their disk drives. This is usually done with a destructive test, measuring the torque required to twist out sample head/suspension assemblies using hand-operated tools, offering little in the way of accuracy of measurement and reliability of method. What is needed is a method and apparatus that will allow swaged connections to be formed under very controlled conditions and then to be tested by the application of precisely-controlled torques, to yield accurate displacement data of the head/suspension assembly. Precise failure information can thereby be gathered to allow manufacturing processes to produce better, stronger disk drive head suspensions, resulting in better disk drive performance and lower failure rate.

SUMMARY OF THE INVENTION

The present invention provides a means and apparatus that overcomes the shortcomings of the prior art by first forming a swaged connection and then measuring the twist-out torque required to cause such swaged connection to fail. Test components are clamped together with a selected force, then swaged together while the swage ball driving force is measured and recorded. The swage mount is then subjected to a program of known, measured torques designed to test its resistance to twisting out. The displacement of the workpiece is measured by a laser beam, allowing precise displacement/time profiles, in addition to the torque/time profiles, to be generated.

In the present invention, a computer-controlled swage ram is used to clamp the components together and force the swage ball through the swage mount during the swaging process. The computer and associated software control the clamp force, acceleration, maximum speed, downward travel, deceleration, and resetting of the swage ram and all items attached to it. A compression force strain gage measures the force required to push the swage ball through the swage mount. Prior to the ball being driven through, a clamp, integral to the swage ram, makes contact with the components of the workpiece to be swaged to force them together and to maintain them in precise alignment and position. The force of its contact is kept constant by means of a pneumatic cylinder pressurized by an external attenuator air tank.

After the swaged connection has been formed between components, the assembly is located under the torque-out station to be twisted apart to measure the strength of the swage bond. A power twist-out mechanism, controlled by the computer, allows precise known torques to be applied as impulses or as a time-dependent variable force. A laser beam detects any displacement of the test components, allowing detailed real time torque and displacement profiles to be generated. A fixtured torque strain gage, rather than the traditional hand-held and located torque watch, produces accurate and repeatable torque readings.

The information gathered by the computer during the swaging and twist-out stages of the process allows the design of the components to be optimized and enables the process operators to adjust the manufacturing process to insure high-quality swage bonds, resulting in disk drive mechanisms with longer useful lives.

Other features and advantages of the invention will become apparent from the following detailed description, taken in conjunction with the accompanying drawings, which illustrate, by way of example, the features of the invention.

DETAILED DESCRIPTION OF THE PREFERRED EMBODIMENT

Figure 1:
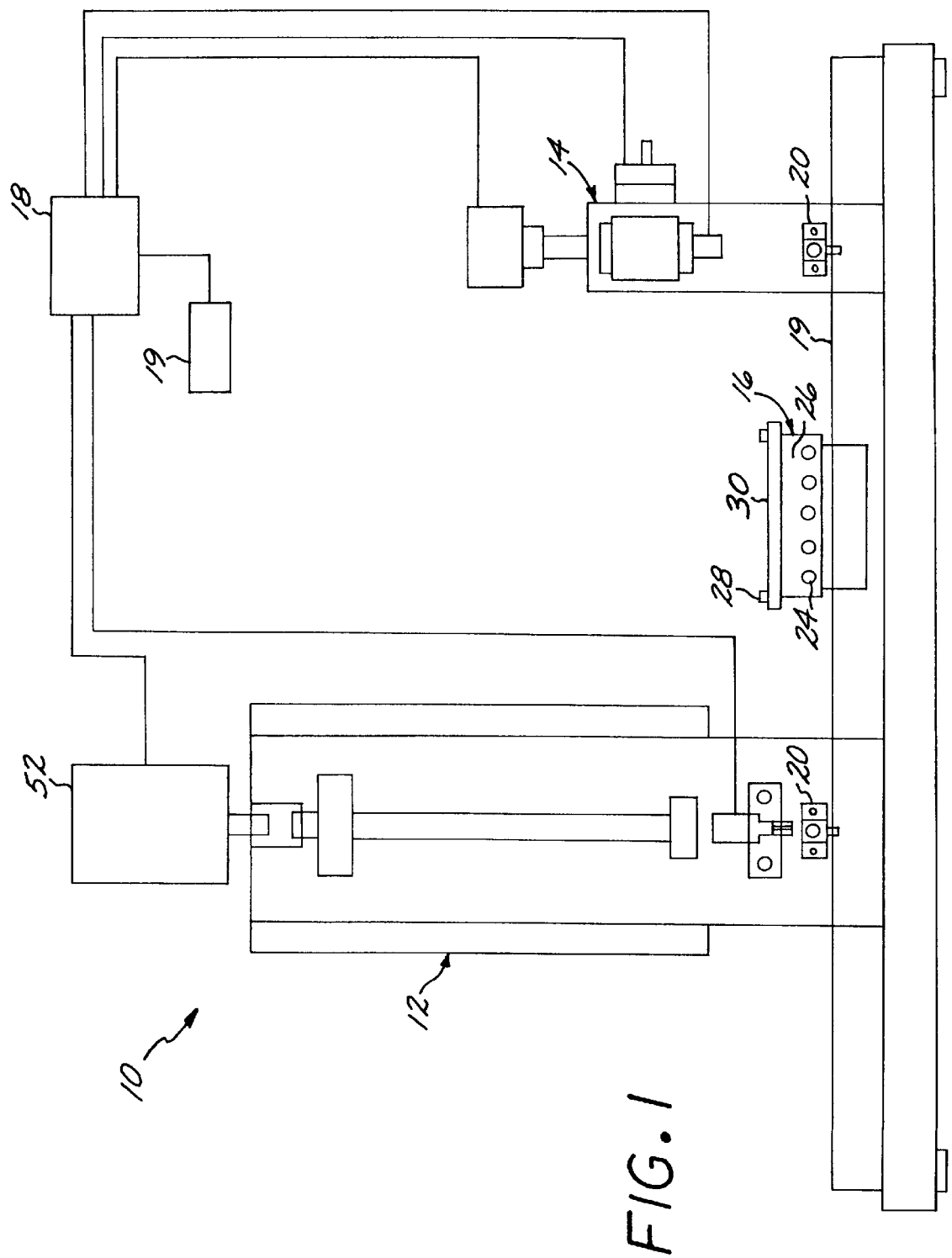
FIG. 1 shows a semi-schematic frontal view of the swage mount testing apparatus of the present invention.

As is generally shown in FIG. 1, the invention is embodied in an apparatus 10 having a swaging station 12 for attaching a computer disk drive suspension assembly to a test coupon by the industry-standard "swaging" process, and a torque-out station 14 for testing the performance of the resulting swaged connection. A carriage 16 is shiftable from part to part and between the two stations while a computer 18 monitors and controls the function of the entire apparatus.

Up to five workpieces are processed at a time on the sliding ball bearing carriage 16 movable along a linear guide assembly 19. The carriage is used to position each workpiece under either the swage station 12 or the torque-out station 14 while a jig pin 20 that is received in one of several positioning holes 24 serves to lock the carriage in place relative to locator plate 26. The coupons are placed over locating pins 28 on an anvil plate 30. The suspension assemblies are rotationally oriented by placement of orientation pins through the holes formed in the load beams and into orientation slots formed in the anvil plate.

Figure 2:
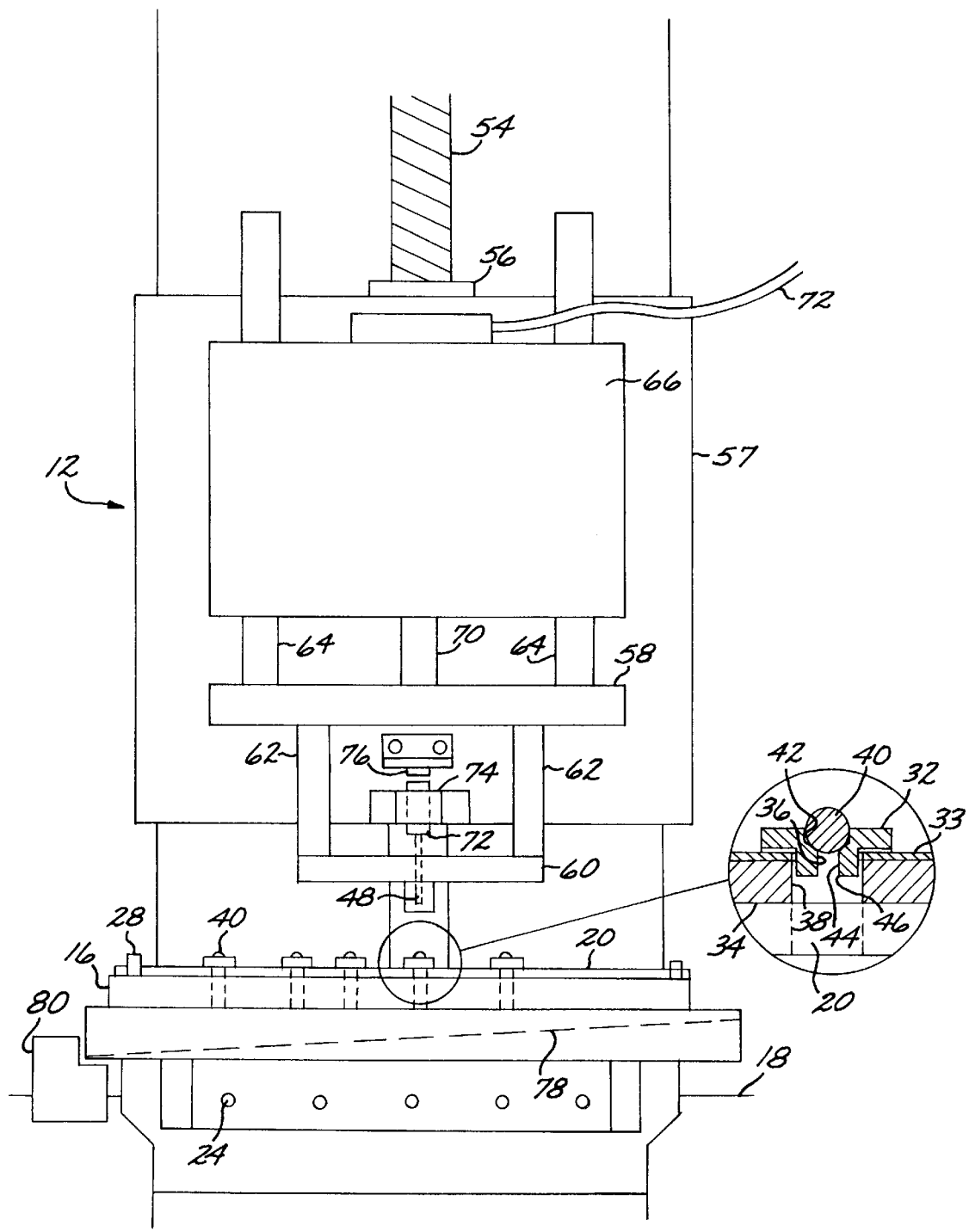
FIG. 2 is a semi-schematic frontal view of the swaging station.
Figure 3:
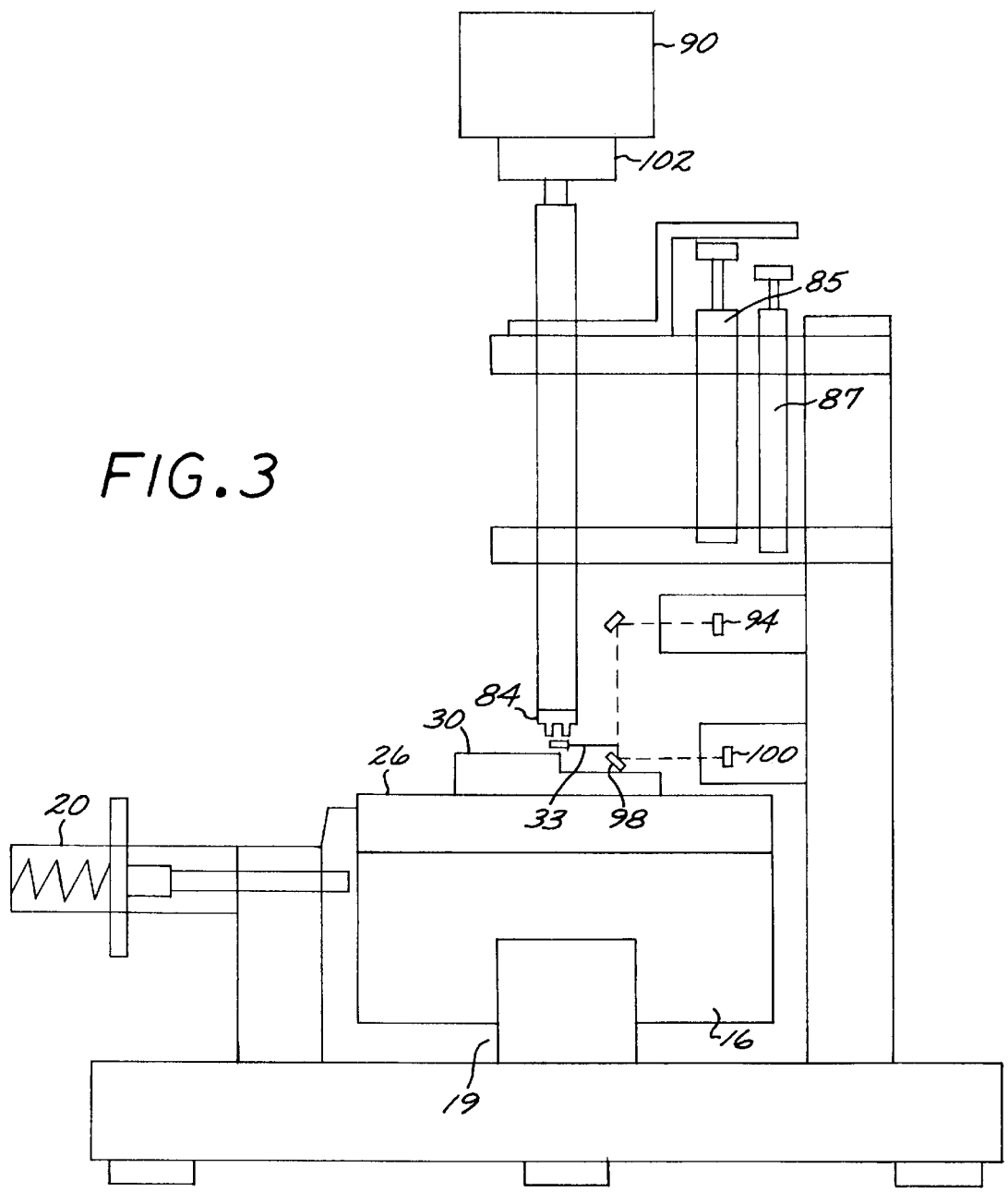
FIG. 3 is a semi-schematic side view of the twist out torque measuring station.

FIG. 2 illustrates the carriage 16 locked in place within the swaging station 12. For a "tension" direction swage, the suspension assembly plate 32 is placed on top of the coupon 34 so that the swage boss 36 extends down from the swage plate, through the loadbeam 33 and into the coupon hole 38. For a "compression" direction swage, the suspension assembly is placed between the anvil plate 30 and the coupon, with the swage boss oriented upwardly to extend into the coupon hole.

In the case of a tension swage, a first-pass swage ball 40 of selected diameter and coating is wetted with a selected lubricant, and then placed into a counter-bore 42 of the swage plate 32. In the case of a compression swage, the ball is placed through the coupon hole 38 and into the inside diameter 44 of the swage boss 36, resting against an inside diameter chamfer 46. When the suspension assembly/coupon/ball combination is located under the swage pin 48 by the jig pin 20 engaging the appropriate positioning hole 24, the suspension assembly is ready to be swaged to the coupon.

The swaging process is initiated via computer 18 running appropriate software and through control buttons on a control panel 19. This initiation causes a stepper motor 52 to rotate a ball screw 54, threaded through a ball screw nut 56 attached to a swage ram mount plate 58, causing the plate to move downward. Acceleration, maximum speed, downward travel, and deceleration of the swage ram 57 are set and controlled by the software.

When the upper clamp plate 60 contacts the swage plate 32 (for a tension swage) or the coupon 34 (for a compression swage), the clamp plate, vertical supports 62, ram mount plate 58, and guide rods 64 of the linear thruster 66 halt their downward travel and become stationary. This compresses a linear thruster pneumatic cylinder 70 as the swage ram 57 continues to travel downward. The pneumatic cylinder is pressurized with compressed air from a tank/attenuator 104 (not shown) via conduit 72. Because the change in volume due to the air cylinder compression is insignificant compared to the volume of the tank, the clamp force is constant during the entire stroke of the swage ram. The clamp force is set through the software, which controls the air pressure regulator on the tank.

After the clamp 60 contacts the swage plate 32 or coupon 34, the swage ram continues its downward travel causing swage pin 48 to protrude below the upper clamp plate. Once the pin 48 contacts the swage ball 40 resting in the swage plate, it forces a pin bushing 72 to slide upward, relative to the downward-moving swage ram 57, in a guide bushing 74 until it contacts the button of a compression strain gage load cell 76. The swage ball is then forced through the swage boss inside diameter 44. The force required to push the ball through the boss is measured by the compression force strain gage load cell and recorded. The resulting swage force/time profile is analyzed for maximum swage force and total swage work or energy input by the software. Once the ball is pushed completely through the swage boss of the suspension, the swage ram decelerates, reverses direction, and returns to its home position. The swage ball rolls down a ramp 78 into a ball catch cup 80.

After a post-swage measurement is completed for comparison to the pre-swage gramload, the swaged workpiece may be moved to the torque out station 14 to determine the amount of torque required to permanently displace the load beam relative to the actuator arm, which in operation would result in a "head off-track" condition in the disk drive.

The coupon/suspension assemblies are loaded back onto the pins 28 of the anvil plate 30 facing upward (as in the tension swage direction). With the workpiece to be tested positioned within carriage 16 and locked in place under the torque-out station 14 by the jig pin 20, the torque gage slide assembly 82 can be lowered to bring a torque-out socket 84 over the swage plate of the suspension assembly set on the anvil plate. This is accomplished by retraction of a computer controlled air cylinder 85 causing the torque gage 102 to lower by means of roller slide 88. The stop height of the torque gage slide assembly is set by a micrometer adjustable stop (not shown). Dashpot 87 shows the torque gage assembly before it contacts the stop.

The torque-out socket 84 is now situated over the swage plate 32 of the workpiece such that the walls of the socket engage two edges to impart a couple on the workpiece when the torque shaft 88 is turned either by hand or by a power twist-out head 90. The suspension assembly under the torque socket is in a position such that a portion of the load beam 33 furthest from the swaged attachment point, passes through a portion of a 1×5 mm cross section of a displacement-sensing laser path 92. This beam is generated by a laser transmitter 94, reflected downward through the plane of the suspension by mirror 96 and reflected back horizontally to a laser receiver 100 by a second mirror 98. Any displacement of the load beam results in a change in the received laser intensity which is measured and interpreted by the software.

To twist the suspension out and complete the test, torque is applied either by hand via the housing of the reaction torque strain gage or via a servo motor 90 controlled by the software. In the standard twist-out test, the torque applied to the suspension is increased linearly by a selected slope until it overcomes the frictional forces created by the swaged press fit between the swage boss 36 and the coupon hole 38 and the suspension assembly breaks away, blocking more and more of the laser beam 92. The actual applied torque/time and displacement/time histories are measured by the reaction torque strain gage 102, the displacement-sensing laser beam, and the software. These torque/time and displacement/time profiles can then be analyzed by the software to determine the torque required to cause sufficient rotational displacement to be considered a failure i.e. breakout or twist-out torque.

In the cyclic torque test, the software sends a signal to a servo-motor driver that causes the power twist assembly 90 to produce either a repetitive sawtooth or half sine wave torque/time profile, with peaks below the standard breakaway torque. Feedback from the displacement-sensing laser beam 92 is used to determine how many cycles of applied torque are required before a small suspension breakaway, of a magnitude that would cause disk drive problems, occurs.

While a particular form of the invention has been illustrated and described, it will also be apparent to those skilled in the art that various modifications can be made without departing from the spirit and scope of the invention. Accordingly, it is not intended that the invention be limited except by the appended claims.

What is claimed is:

1. A swaged connection testing apparatus, comprising:
   a first station for forming a swaged connection in a workpiece;
   a second station for measuring twist-out torque of such swaged connection formed in said workpiece; and
   a carriage for positioning and supporting said workpiece while said swaged connection is formed in said first station, for positioning supporting said workpiece while said twist-out torque is measured in said second station and for transporting said workpiece between said stations.

2. The swaged connection testing apparatus of claim 1 wherein said first station comprises:
   a mechanism for securely holding said workpiece in position;
   a ram for forcing a swaging ball through said workpiece;
   a controller for precisely controlling the position of said ram; and
   instrumentation for measuring and recording the force applied to said ball.

3. The swaged connection testing apparatus of claim 1 wherein said second station comprises:
   a torque socket for engaging said workpiece;
   a laser beam directed at said workpiece such that a first portion of said beam impinges on said workpiece and a second portion passes thereby; and
   a laser receiver positioned to receive said second portion of said beam and measure its intensity whereby movement of said workpiece causes said measured intensity to change.

4. The swaged connection testing apparatus of claim 3 further comprising a mechanism for manually applying torque to said torque socket.

5. The swaged connection testing apparatus of claim 3 further comprising a computer controlled servo motor for applying torque to said torque socket.

6. A method for measuring the strength of a swaged connection joining workpiece components, comprising the steps of:
   selecting an apparatus for applying a torque on a first of said workpiece components;
   securely fixturing a second of said workpiece components;
   directing a beam of light at a section of said workpiece components such that a first portion of said beam impinges on said section of workpiece and a second portion is unaffected by said workpiece;
   measuring the intensity of said second portion of said beam;
   applying a torque on said first workpiece;
   measuring said torque applied on said first workpiece; and
   comparing said measured intensity with said measured torque to determine the strength of said swaged connection.

7. The method of claim 6 wherein said applied torque is increased in a substantially linear fashion.

8. The method of claim 7 wherein torque is applied manually.

9. The method of claim 7 wherein torque is applied automatically.

10. The method of claim 6 wherein said torque is applied in a repetitive sawtooth torque/time profile with peaks below a standard breakaway torque.

11. The method of claim 6 wherein said torque is applied in half since torque/time profile with peaks below a standard break-away torque.

* * * * *